(12) United States Patent
Gibson et al.

(10) Patent No.: US 9,637,105 B2
(45) Date of Patent: May 2, 2017

(54) METHOD AND SYSTEM FOR IMPROVING VEHICLE LAUNCH

(71) Applicant: Ford Global Technologies, LLC, Dearborn, MI (US)

(72) Inventors: Alex O'Connor Gibson, Ann Arbor, MI (US); Jeffrey Allen Doering, Canton, MI (US); David Oshinsky, Trenton, MI (US); Dennis Craig Reed, Dexter, MI (US); Adam Nathan Banker, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 980 days.

(21) Appl. No.: 13/650,862

(22) Filed: Oct. 12, 2012

(65) Prior Publication Data

US 2014/0106927 A1    Apr. 17, 2014

(51) Int. Cl.
| | |
|---|---|
| *B60W 10/02* | (2006.01) |
| *B60W 10/08* | (2006.01) |
| *B60W 10/10* | (2012.01) |
| *B60W 20/00* | (2016.01) |
| *F16H 61/02* | (2006.01) |
| *F16H 61/688* | (2006.01) |
| *F16D 28/00* | (2006.01) |
| *F16D 21/06* | (2006.01) |
| *F16D 23/12* | (2006.01) |

(52) U.S. Cl.
CPC ............ *B60W 10/02* (2013.01); *B60W 10/08* (2013.01); *B60W 10/10* (2013.01); *B60W 20/00* (2013.01); *F16D 28/00* (2013.01); *F16H 61/02* (2013.01); *F16H 61/688* (2013.01); *F16D 2021/0615* (2013.01); *F16D 2021/0646* (2013.01); *F16D 2023/126* (2013.01); *F16H 2312/022* (2013.01); *Y10T 477/26* (2015.01); *Y10T 477/641* (2015.01)

(58) Field of Classification Search
CPC ................... F16H 2312/022; F16H 2061/283
USPC ...................................................... 477/171
See application file for complete search history.

(56) References Cited

U.S. PATENT DOCUMENTS

| | | | |
|---|---|---|---|
| 5,704,873 A * | 1/1998 | Iwata ................. | F16H 61/20 477/115 |
| 6,802,796 B2 | 10/2004 | Asa et al. | |
| 7,249,537 B2 * | 7/2007 | Lee .................... | B60K 6/36 74/661 |
| 7,976,427 B2 | 7/2011 | Yamamoto et al. | |
| 8,169,173 B2 | 5/2012 | Doerr et al. | |
| 2006/0185459 A1 * | 8/2006 | Matsumura .......... | F16D 48/064 74/335 |
| 2010/0056333 A1 * | 3/2010 | Okumoto ............ | F16H 61/0021 477/127 |
| 2011/0301791 A1 * | 12/2011 | Swales et al. ................. 701/22 | |
| 2012/0083952 A1 * | 4/2012 | Smith ................... | B60K 6/442 701/22 |

\* cited by examiner

*Primary Examiner* — Stacey Fluhart
(74) *Attorney, Agent, or Firm* — David Kelley; McCoy Russell LLP (57) ABSTRACT

A method and a system for improving operation of a hybrid vehicle are presented. In one example, a clutch is operated while a vehicle is stopped and while a vehicle brake is applied to determine a clutch torque transfer function. The approach may improve vehicle launch after an engine stop.

4 Claims, 6 Drawing Sheets

METHOD AND SYSTEM FOR IMPROVING VEHICLE LAUNCH

FIELD

The present description relates to a system and methods for improving vehicle launch. The methods may be particularly useful for engines that are selectively coupled to an electrical machine and a transmission.

BACKGROUND AND SUMMARY

A hybrid vehicle may launch (e.g., accelerate from a stop) via power provided by an engine, a motor, or a combination of the motor and the engine. It may be desirable to supply a known amount of motor and/or engine torque during vehicle launch to vehicle wheels so that the vehicle accelerates at a desired rate. However, variations in manufacturing and clutch wear may make it difficult to know how much torque is being provided to vehicle wheels. Consequently, a vehicle may not behave as is desired during vehicle launch.

The inventors herein have recognized the above-mentioned issues and have developed a method for controlling a transmission launch clutch, comprising: adjusting a dual layshaft transmission clutch position during a vehicle stop and while vehicle brakes are applied; and adjusting a clutch actuator position during a vehicle launch responsive to an amount of torque transferred through the dual layshaft transmission clutch during adjusting the dual layshaft transmission clutch position during the vehicle stop.

By adjusting clutch operation during conditions when a vehicle is stopped, it may be possible to determine a clutch transfer function that may be applied during vehicle launch conditions. For example, an amount of torque transferred through a transmission clutch may be determined based on current supplied to a driveline integrated starter generator (DISG) while the DISG is operating in a speed control mode and while an application force applied by a clutch actuator is adjusted. The amount of torque transferred versus the clutch position or clutch application force may be stored as a clutch transfer function in memory. The clutch transfer function may then be applied during a vehicle launch to provide a desired torque from the engine to vehicle wheels.

The present description may provide several advantages. For example, the approach may reduce the possibility of reduced or increased vehicle acceleration relative to desired vehicle acceleration. Additionally, the approach may reduce clutch wear. Further, the approach may improve vehicle launch smoothness.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
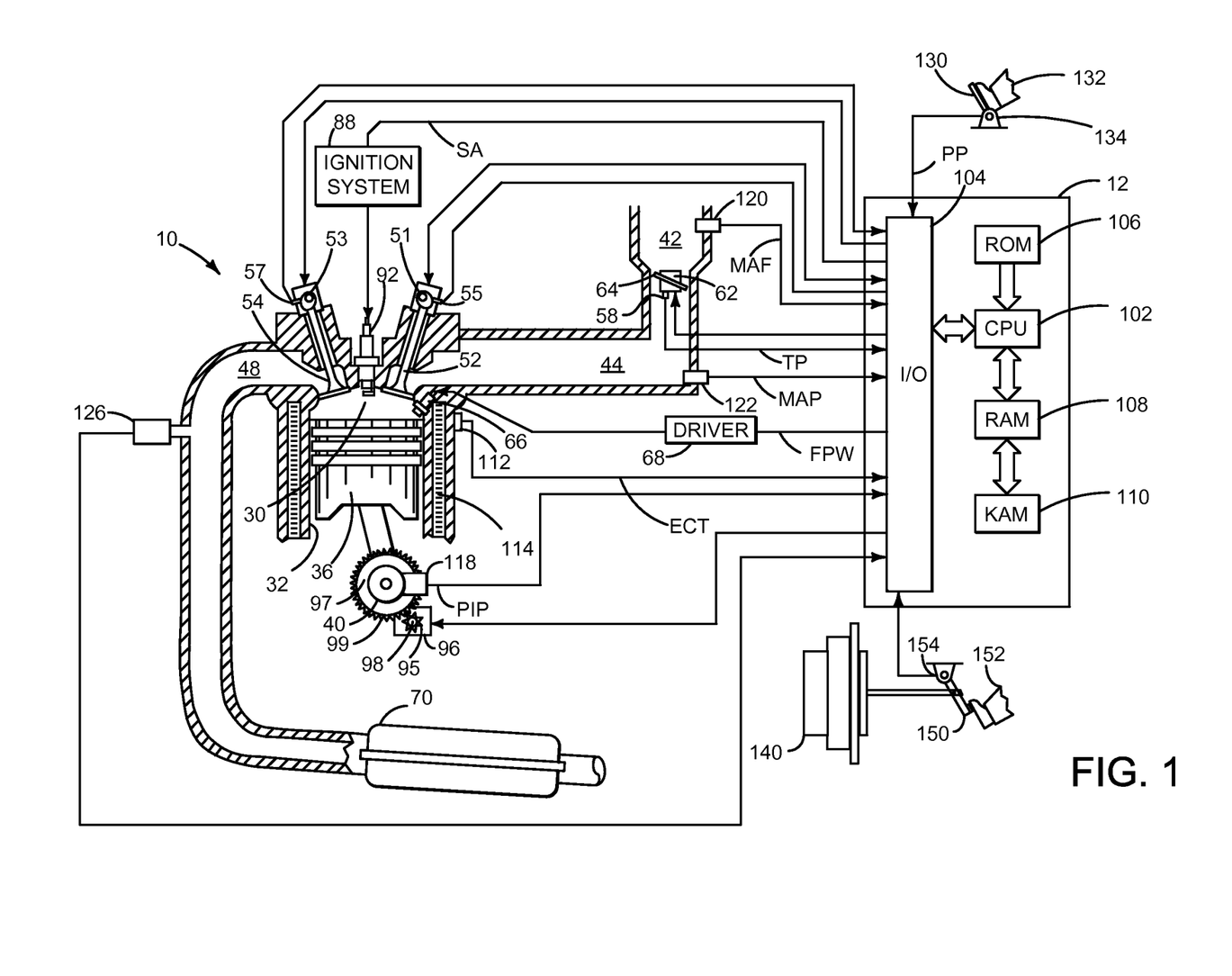
FIG. 1 is a schematic diagram of an engine.
Figure 2:
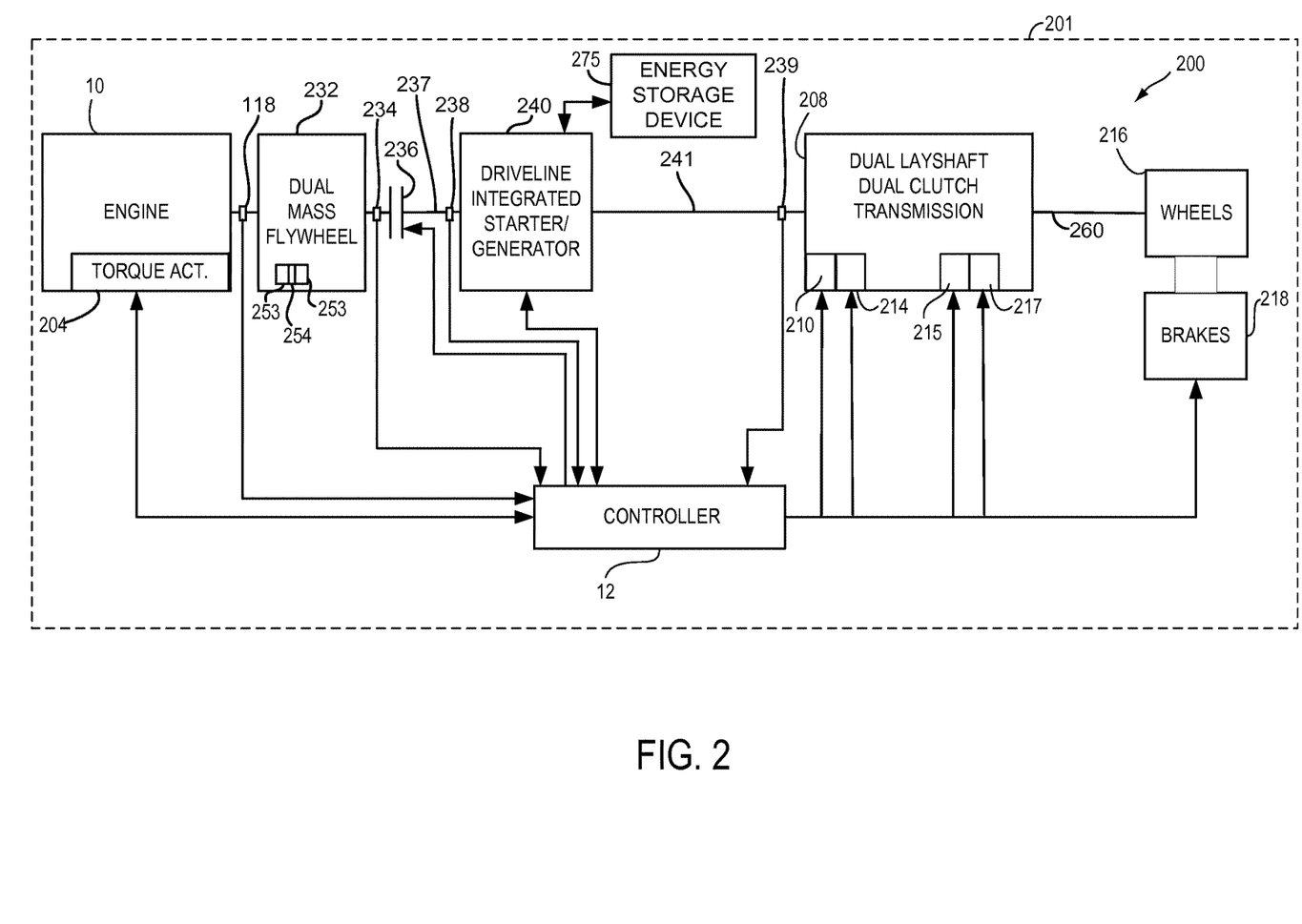
FIG. 2 is shows an example vehicle and vehicle driveline configuration.
Figure 3:
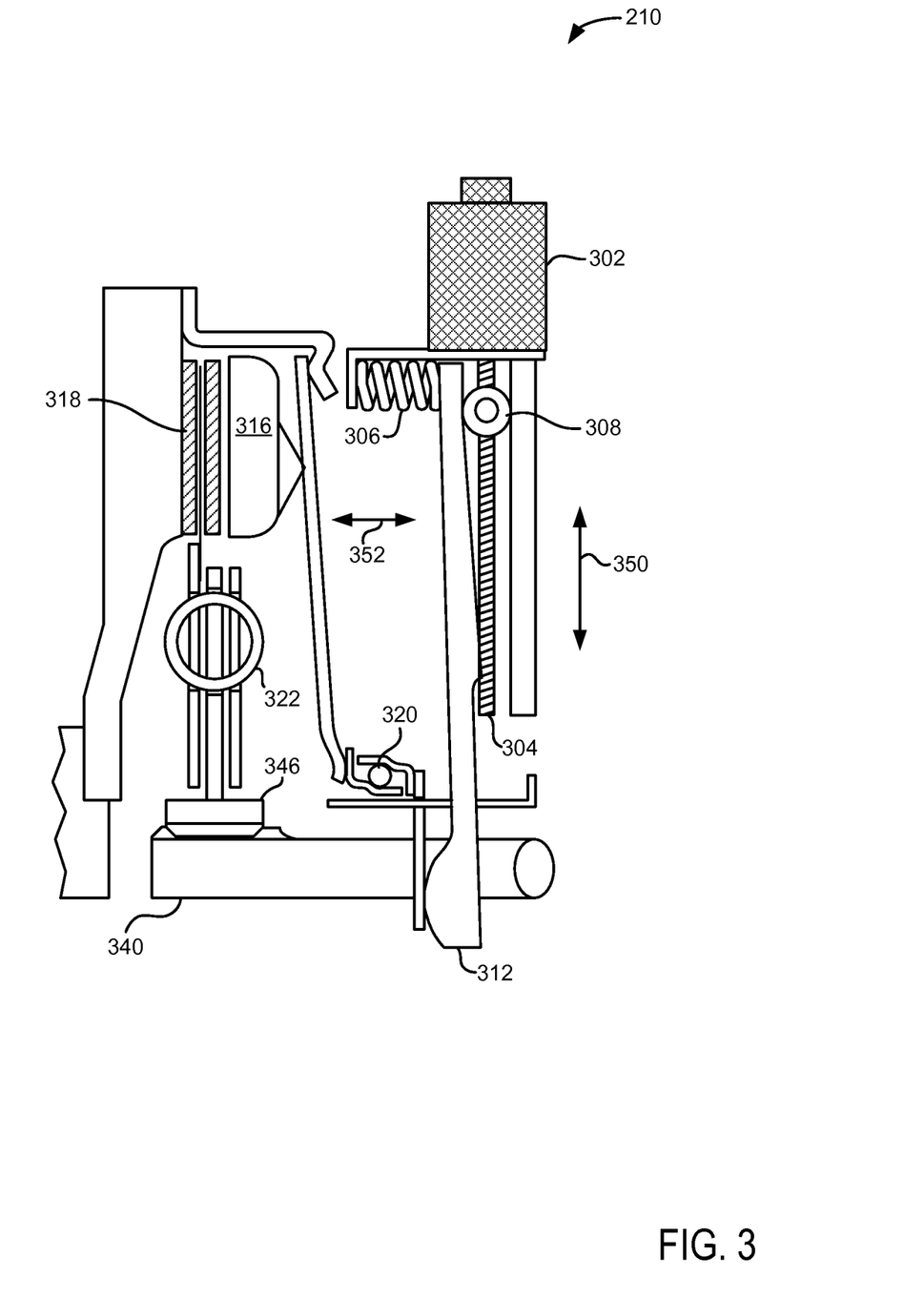
FIG. 3 is a cross section of a first example launch clutch.
Figure 4:
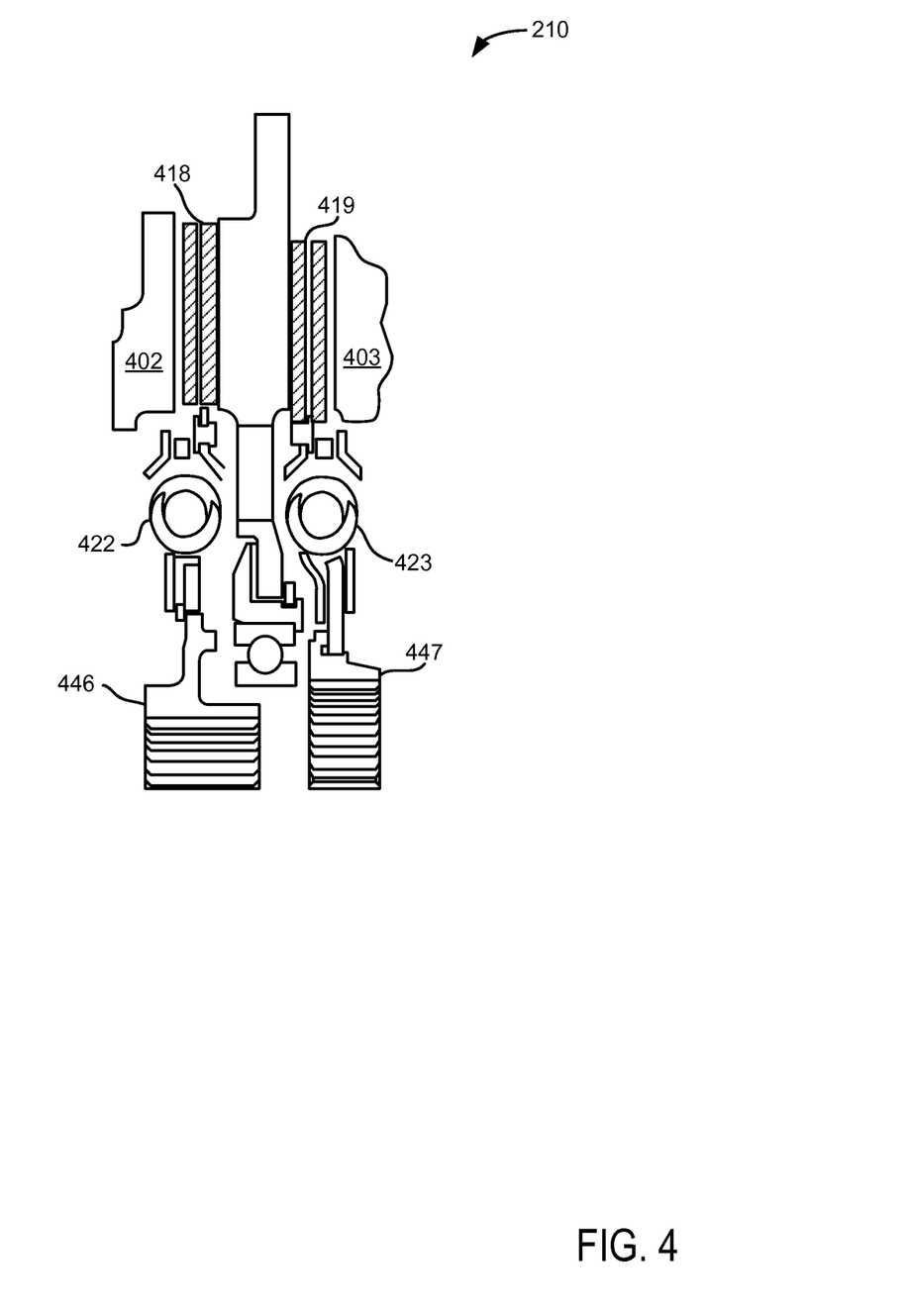
FIG. 4 is a cross section of a second example launch clutch.

The present description is related to controlling a driveline of a hybrid vehicle. The hybrid vehicle may include an engine and electric machine as shown in FIGS. 1-2. The engine may be operated with or without a driveline integrated starter/generator (DISG) during vehicle operation. The driveline integrated starter/generator is integrated into the driveline on the same axis as the engine crankshaft and rotates whenever the torque converter impeller rotates. Further, the DISG may not be selectively engaged or disengaged with the driveline. Rather, the DISG is an integral part of the driveline. Further still, the DISG may be operated with or without operating the engine. The mass and inertia of the DISG remain with the driveline when the DISG is not operating to provide or absorb torque from the driveline. The hybrid vehicle's engine may be stopped as shown in FIGS. 3 and 4 according to the method of FIGS. 5 and 6.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In addition, intake manifold 44 is shown communicating with optional electronic throttle 62 which adjusts a position of throttle plate 64 to control air flow from air intake 42 to intake manifold 44. In one example, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Vehicle wheel brakes or regenerative braking via a DISG may be provided when brake pedal 150 is applied via foot 152. Brake pedal sensor 154 supplies a signal indicative of brake pedal position to controller 12. Foot 152 is assisted by brake booster 140 applying vehicle brakes.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. Engine position sensor 118 produces a predetermined number of equally spaced pulses every revolution of the crankshaft from which engine speed (RPM) can be determined.

In some examples, the engine may be coupled to an electric motor/battery system in a hybrid vehicle as shown in FIG. 2. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 201 and vehicle driveline 200. Driveline 200 may be powered by engine 10. Engine 10 may be started with an engine starting system shown in FIG. 1 or via DISG 240. Further, engine 10 may generate or adjust torque via torque actuator 204, such as a fuel injector, throttle, etc. Driveline 200 includes a dual clutch-dual layshaft transmission (DCT) 208.

DCT 208 is essentially an automatically operated manual transmission. Controller 12 operates first launch clutch 210, second clutch 214, and shifting mechanism 215 to select between gears (e.g., $1^{st}$-$5^{th}$ gears) 217. First launch clutch 210 and second clutch 214 may be selectively opened and closed to shift between gears 217. Output shaft 260 delivers torque from transmission 208 to wheels 216.

An engine output torque may be transmitted to an input side of dual mass flywheel (DMF) 232. Engine speed as well as dual mass flywheel input side position and speed may be determined via engine position sensor 118. Dual mass flywheel 232 may include springs 253 and separate masses 254 for dampening driveline torque disturbances. The output side of dual mass flywheel 232 is shown being mechanically coupled to the input side of disconnect clutch 236. Disconnect clutch 236 may be electrically or hydraulically actuated. A position sensor 234 is positioned on the disconnect clutch side of dual mass flywheel 232 to sense the output position and speed of the dual mass flywheel 232. The downstream side of disconnect clutch 236 is shown mechanically coupled to DISG input shaft 237. A speed sensor or alternatively a torque sensor 238 is positioned in driveline 200 between disconnect clutch 236 and DISG 240.

DISG 240 may be operated to provide torque to driveline 200 or to convert driveline torque into electrical energy to be stored in electric energy storage device 275. DISG 240 has a higher output power capacity than starter 96 shown in FIG. 1. Further, DISG 240 directly drives driveline 200 or is directly driven by driveline 200. There are no belts, gears, or chains to couple DISG 240 to driveline 200. Rather, DISG 240 rotates at the same rate as driveline 200. Electrical energy storage device 275 may be a battery, capacitor, or inductor. The downstream side of DISG 240 is mechanically coupled to dual layshaft transmission 208. The upstream side of the DISG 240 is mechanically coupled to the disconnect clutch 236. Transmission input shaft 241 mechanically couples disconnect clutch 236 to dual layshaft transmission 208. In some examples, 238 and/or 239 may be torque sensors or may be combination position (position) and torque sensors.

Torque output from the dual layshaft transmission 208 may in turn be relayed to rear wheels 216 to propel the vehicle via output shaft 260. Specifically, dual layshaft transmission 208 may transfer an input driving torque at the input shaft 241 responsive to a vehicle traveling condition before transmitting an output driving torque to the rear wheels 216.

Further, a frictional force may be applied to wheels 216 by engaging wheel brakes 218. In one example, wheel brakes 218 may be engaged in response to the driver pressing his foot on a brake pedal (not shown). In other examples, controller 12 or a controller linked to controller 12 may apply engage wheel brakes. In the same way, a frictional force may be reduced to wheels 216 by disengaging wheel brakes 218 in response to the driver releasing his foot from a brake pedal. Further, vehicle brakes may apply a frictional force to wheels 216 via controller 12 as part of an automated engine stopping procedure.

Controller 12 receives inputs from engine 10, as shown in more detail in FIG. 1, and accordingly controls a torque output of the engine and/or operation of the torque converter, transmission, DISG, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output. Controller 12 may also control torque output and electrical energy production from DISG by adjusting current flowing to and from field and/or armature windings of DISG as is known in the art.

When idle-stop conditions are satisfied, controller 42 may initiate engine shutdown by shutting off fuel and spark to the engine. However, the engine may continue to rotate in some examples.

A wheel brake pressure may also be adjusted during the engine shutdown. In one example, the wheel brake pressure may be adjusted to coordinate the application of the wheel brakes with the operating transmission clutches 210 and 214 during the engine shutdown. When restart conditions are satisfied, and/or a vehicle operator wants to launch the vehicle, controller 12 may reactivate the engine by resuming combustion in engine cylinders.

Referring now to FIG. 3 an example first launch clutch 210 is shown. First launch clutch 210 includes friction discs 318 which apply force to transfer torque to shaft 340 via spline 346. Damper spring 322 reduces oscillations through the transmission when force is applied to friction discs 318. Electric motor 302 rotates screw 304 and causes roller 308 to move linearly in the directions of arrows 350. Roller 308 acts on lever 312 to adjust the position of pressure plate 316 as indicated by arrows 352. Return spring 306 applies force opposing the force applied by electric motor 302 to lever 312 via roller 308. In this way, return spring 306 releases pressure plate 316 from applying force to friction discs 318 when roller 308 is in the position shown. Lever 312 transfers force from electric motor 302 to pressure plate 316 via engagement bearing 320.

Referring now to FIG. 4, an alternative example first launch clutch 210 and second clutch 214 that includes two sets of friction discs and two pressure plates is shown. The clutches shown in FIG. 4 may be applied and released via an electrical actuator similar to that shown in FIG. 3.

In this example, first launch clutch 210 includes a first set of friction discs 418 and a second set of friction discs 419. Engine torque is transferred from the engine to first spline 446 when first pressure plate 402 applies force to the first set of friction discs 418. In one example, first spline 446 transfers engine torque to a first layshaft. Similarly, engine torque is transferred from the engine to second spline 447 when second pressure plate 403 applies force to the second set of friction discs 419. Damper springs 422 and 423 limit oscillations through the transmission when engine torque is transferred to splines 446 and 447 respectively.

Thus, the system of FIGS. 1-4 provides for a system for controlling a transmission clutch, comprising: a vehicle including brakes; an engine coupled to the vehicle; a DISG: a disconnect clutch positioned in a driveline between the engine and the DISG; a dual mass flywheel positioned in the driveline between the engine and the disconnect clutch; a transmission positioned in the driveline downstream of the DISG, the transmission including a clutch; and a controller, the controller including non-transitory executable instructions for adjusting an application force of the clutch in response to the brakes being applied and the vehicle being stopped. In this way, a transmission clutch may be adjusted to improve vehicle launch.

The system further comprises additional non-transitory executable instructions for operating the DISG at a constant speed while the application force of the clutch is adjusted. The system further comprises additional non-transitory executable instructions for determining an amount of torque transferred across the clutch when the application force of the clutch is adjusted. The system further comprises additional non-transitory executable instructions for adjusting the clutch during a vehicle launch responsive to the amount of torque transferred across the clutch when the application force of the clutch is adjusted. The system further comprises additional non-transitory executable instructions for determining the amount of torque transferred across the clutch based on a DISG current. The system further comprises additional non-transitory executable instructions for adjusting a clutch transfer function in response to the amount of torque transferred across the clutch.

Figure 5:
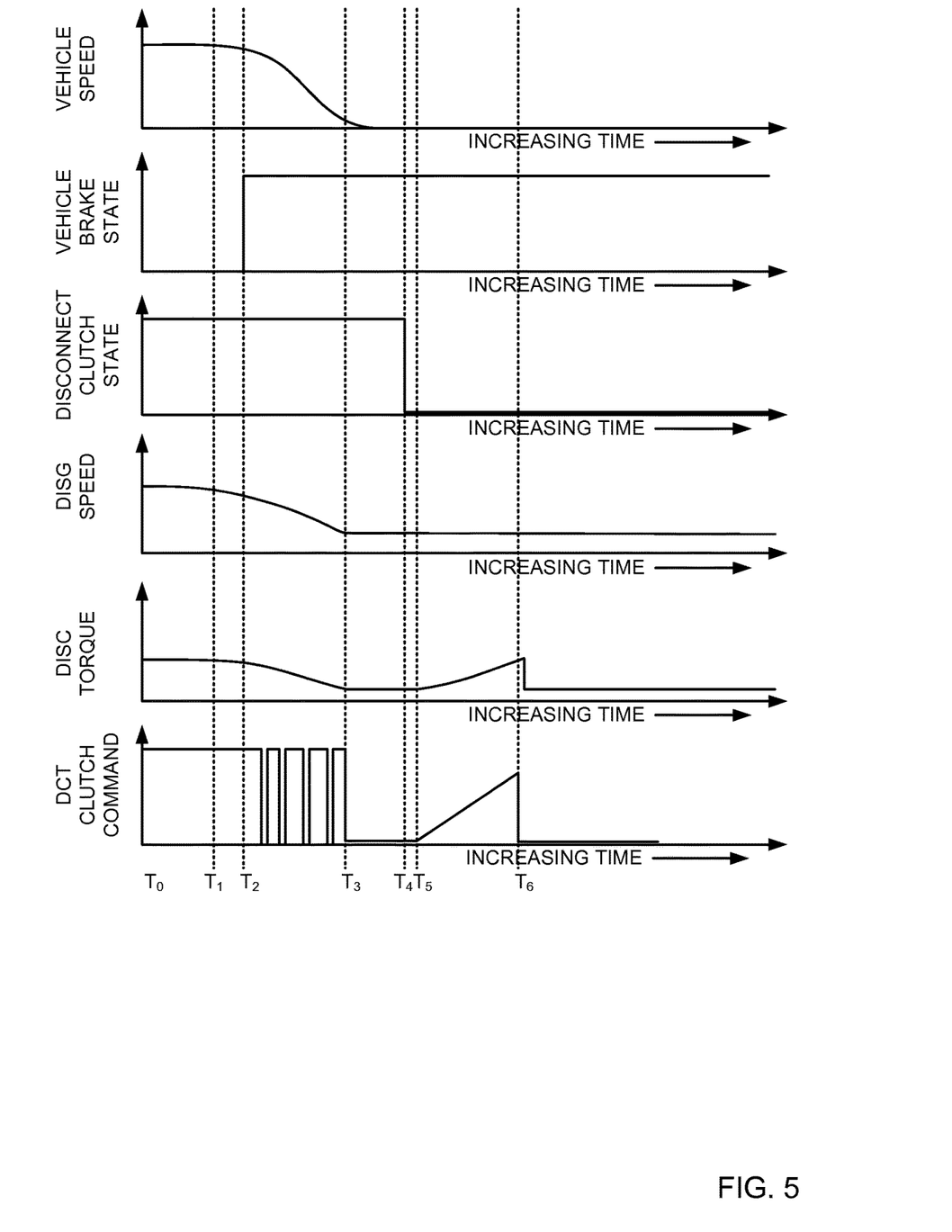
FIG. 5 is a prophetic operating sequence for adjusting launch clutch application force.

Referring now to FIG. 5, an example operating sequence for adjusting a launch clutch transfer function and launch clutch application force. The sequence may be provided by the system of FIGS. 1-4 according to the method of FIG. 6.

The first plot from the top of FIG. 5 is a plot of vehicle speed versus time. The Y axis represents vehicle speed and vehicle speed increases in the direction of the Y axis arrow. The X axis represents time and time increase from the figure's left side to the figure's right side.

The second plot from the top of FIG. 5 is a plot of vehicle brake state versus time. The Y axis represents vehicle brake state. A lower level vehicle brake state indicates vehicle brakes are not applied. A higher level vehicle brake state indicates vehicle brakes are applied. The X axis represents time and time increase from the figure's left side to the figure's right side.

The third plot from the top of FIG. 5 is a plot of disconnect clutch state versus time. The Y axis represents vehicle brake state. A lower level disconnect clutch state indicates the disconnect clutch is not applied. A higher level disconnect clutch state indicates the disconnect clutch is applied. The X axis represents time and time increase from the figure's left side to the figure's right side.

The fourth plot from the top of FIG. 5 is a plot of DISG speed versus time. The Y axis represents DISG speed and DISG speed increases in the direction of the Y axis arrow. The X axis represents time and time increase from the figure's left side to the figure's right side.

The fifth plot from the top of FIG. 5 is a plot of DISG torque versus time. The Y axis represents DISG torque as determined from DISG current and DISG torque increases in the direction of the Y axis arrow. The X axis represents time and time increase from the figure's left side to the figure's right side.

The sixth plot from the top of FIG. 5 is a plot of DCT launch clutch command force versus time. The Y axis represents DCT launch clutch command position which translates into a DCT launch clutch force, and the DCT launch clutch command force increases in the direction of the Y axis arrow. The X axis represents time and time increase from the figure's left side to the figure's right side.

At time $T_0$, vehicle speed is at a higher level and the vehicle brake is not applied as indicated by the vehicle brake state being at a lower level. The disconnect clutch is also closed and the DISG speed is at a relatively higher level. The DISG torque is at a higher level and the DCT clutch command force is at a higher level to indicate that the DCT clutch is fully engaged.

At time $T_1$, the driver releases the vehicle accelerator to begin reducing vehicle speed in response to driving conditions. The vehicle brake is not applied as indicated by the vehicle brake state being at a lower level. The disconnect clutch remains closed and the DISG speed and torque are reduced in response to the driver releasing the vehicle accelerator pedal. The DCT clutch command remains at a higher level indicating that the DCT clutch is fully engaged.

At time $T_2$, the vehicle brake is applied in response to vehicle driving conditions by the driver. The vehicle brake state transitions from a lower level to a higher level when the vehicle brake is applied. The disconnect clutch remains applied at a higher level so that the disconnect clutch remains closed. The DISG speed continues to be reduced as is the DISG torque. The DCT clutch force remains at a higher level and it indicates that the DCT clutch is engaged.

Between time $T_2$ and time $T_3$, the DCT clutch is applied and released several times and the transmission is downshifted from a higher gear to a lower gear in response to vehicle speed and requested engine torque. The vehicle brake remains applied as indicated by the vehicle brake state being at a higher level. The vehicle speed continues to decrease and DISG speed and torque decrease further.

At time $T_3$, the DCT clutch is held open as indicated by the DCT clutch transitioning to a lower state. The driver continues to hold the vehicle brake in an applied state as indicated by the vehicle brake state being at a higher level. The disconnect clutch remains closed as indicated by the disconnect clutch trace state being at a higher level. DISG speed and torque are reduced to lower levels to conserve energy. In one example, the DISG speed is maintained at an engine idle speed level.

At time $T_4$, the disconnect clutch transitions from a closed state to an open state in response to conditions being present for determining the DCT launch clutch's transfer function. In one example, the DCT launch clutch transfer function is an actuator position versus force transferred across the DCT launch clutch. The amount of torque transferred across the DCT clutch may increase as the actuator position increases until the DCT clutch is fully closed.

Between time $T_4$ and time $T_5$, the DISG is controlled in a closed loop speed mode in response to conditions being present for mapping DCT clutch transferred torque. In the closed loop speed mode, DISG current may be increased or decreased to hold the DISG at a constant speed, and DISG torque may be determined from the DISG current. In particular, each DISG current amount translates to a unique DISG torque. In one example, the DISG current and DISG torque relationship is stored as a function in memory. Therefore, DISG current is monitored and then converted into a torque amount that represents an amount of torque transferred across the DCT clutch. The DISG current and torque are determined while the disconnect clutch and DCT clutch are disengaged to provide a base DISG current amount.

At time $T_5$, the DCT launch clutch command is ramped to increase the DCT position and application force. The DCT application force is ramped in response to having determined DISG current while the disconnect clutch is open. The DCT launch clutch command may be increased at a predetermined rate until a predetermined DCT launch clutch position and/or application force is achieved. The amount of torque transferred from the DISG to the vehicle wheels via of the DCT clutch increases as the DCT clutch position and application force increase. Each time the DCT position and application force are increased, the DISG current is monitored and converted into a DCT torque value. The DCT torque values and DCT positions are stored in memory as a DCT transfer function that may be applied during vehicle launch and shifting.

At time $T_6$, the DCT launch command reaches a predetermined level and DCT clutch mapping ceases in response to the DCT position reaching a desired position. Once torque transferred by the DCT clutch is mapped to DCT clutch position, the mapped DCT clutch torque is used during vehicle launch to control wheel torque.

Figure 6:
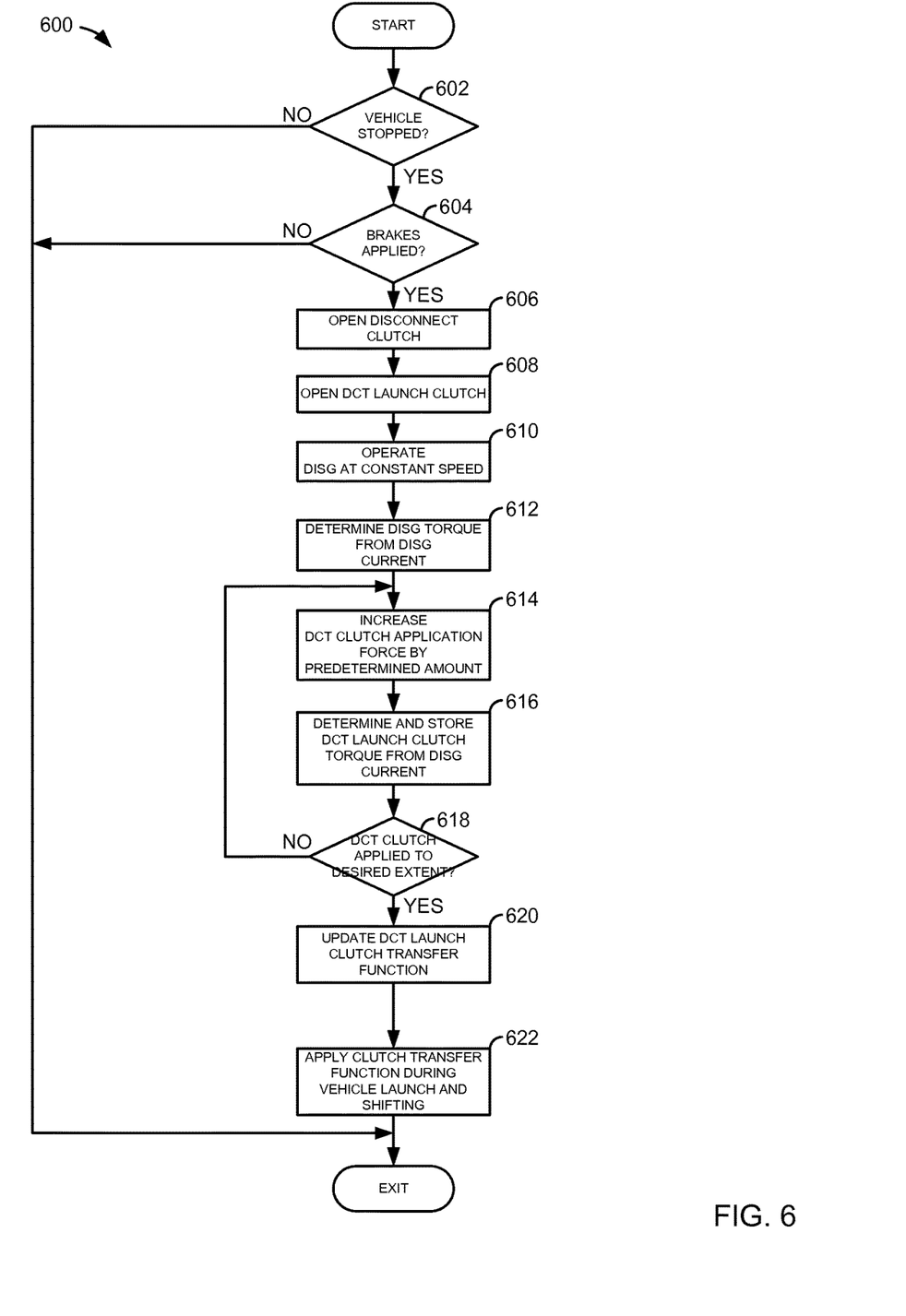
FIG. 6 is an example method for adjusting a launch clutch transfer function and adjusting launch clutch application force.

Referring now to FIG. 6, a method for adjusting a launch clutch transfer function and launch clutch application force is described. The method of FIG. 6 may be applied to the system of FIGS. 1-4. Additionally, the method of FIG. 6 may be stored as executable instructions in non-transitory memory of the system described in FIGS. 1-4. The method of FIG. 6 may be executed in response to vehicle launch speed deviating from a desired or expected vehicle launch speed or at predetermined time intervals.

At 602, method 600 judges whether or not the vehicle is stopped. Method 600 may judge the vehicle is stopped in response to a vehicle speed sensor. If method 600 judges that the vehicle is stopped, method 600 proceeds to 604. Otherwise, method 600 exits.

At 604, method 600 judges whether or not vehicle brakes have been applied. Further, in some examples, method 600 judges whether or not a predetermined amount of force is being applied to vehicle brakes. If brakes are applied and/or if a predetermined amount of force is applied to vehicle brakes, method 600 proceeds to 606. Otherwise, method 600 exits.

Thus, at 602 and 604, method 600 judges whether or not select conditions are present for adjusting a DCT clutch transfer function. It should be mentioned that additional, different, and/or fewer conditions may be present before the DCT clutch transfer function is adjusted. For example, the transmission and engine may be required to reach predetermined operating temperatures before proceeding to 606.

At 606, method 600 opens the disconnect clutch. The disconnect clutch is opened so that the engine does not affect the DISG torque that is indicated by DISG current. Method 600 proceeds to 608 after the DISG disconnect clutch is opened.

At 608, method 600 opens the DCT launch clutch. The DCT launch clutch is fully opened so that DISG torque to maintain a desired speed may be accurately determined. Method 600 proceeds to 610 after the DCT launch clutch is opened.

At 610, the DISG is operated in a constant speed mode. Specifically, DISG current is adjusted to hold DISG speed at a desired constant value. In one example, the DISG is operated at a substantially constant (e.g., ±25 RPM) predetermined speed. Method 600 proceeds to 612 after the DISG begins operating in a constant speed mode.

At 612, method 600 determines DISG torque from DISG current. In one example, a function that outputs DISG torque based on DISG current is stored in memory. DISG current is used to index the table and the table outputs DISG torque. The DISG torque is stored in memory as a base DISG torque. Thus, the base DISG torque is determined at a constant DISG speed, with an open disconnect clutch, and with an open DCT launch clutch. In one example, the DCT launch clutch is a clutch that may be selectively opened and closed to transfer engine torque through one of two layshafts. Method 600 proceeds to 614 after the base DISG torque is determined.

At 614, method 600 begins to increase the DCT clutch application force. The DCT clutch application force may be increased via changing a position of an actuator or via changing a command to an actuator (e.g., a duty cycle supplied to an actuator that operates on the DCT clutch). In one example, the DCT clutch application force is increased a plurality of times during DCT transfer function adaptation. Method 600 proceeds to 616 after the DCT clutch application force is increased.

At 616, method 600 determines and stores the DCT launch clutch torque to memory. The DCT launch clutch torque is determined via DISG current. For example, while the DISG is operating at a constant speed and where DISG speed is corrected via increasing or decreasing DISG current responsive to a difference between the desired DISG speed and the actual DISG speed, DISG current is determined and converted to a DISG torque. The torque observed at the DISG via DISG current is an amount of torque that is transferred through the DCT. Thus, the DCT torque is determined from the DISG torque as estimated from DISG current. The DCT application force is increased in a plurality of increments, and DCT torque is determined at each new DCT application force increment from DISG current. The base DISG torque at base DISG current is subtracted from the DCT torque at each particular DCT application force demand to determine the DCT torque at the particular DCT application force. The DCT torque for each DCT application force increment is stored in memory. Method 600 proceeds to 618 after DCT torque at a particular DCT application force is determined.

At 618, method 600 judges whether or not DCT clutch application force has reached a threshold level. The threshold level may be predetermined and stored in memory. In one example, the threshold level is an amount of application pressure where the DCT is fully closed. Once method 600 reaches the predetermined threshold DCT clutch application force, the DCT clutch may be fully opened. Alternatively, the DTC application force may be ramped down while DCT position and transferred torque are stored to memory. In this way, a transfer function for DCT application and a transfer function for DCT release may be provided. If method 600 judges that the DCT clutch application force has reached the predetermined level, method 600 proceeds to 620. Otherwise, method 600 returns to 614.

It should also be mentioned in some examples, the amount of torque transferred by the DCT clutch may be determined at a plurality of DISG speeds and DCT clutch application forces. For example, the torque transferred by the DCT clutch may be determined at a plurality of DCT application forces when DISG speed is 100 RPM. Further, the torque transferred by the DCT clutch may be determined at a plurality of DCT application forces when DISG speed is 150 RPM. Further still, the torque transferred by the DCT clutch may be determined at a plurality of DCT application forces when DISG speed is 200 RPM, and so on.

At 620, method 600 populates a transfer function stored in memory with DCT transfer torque amounts for selected DCT application forces determined at 616. For example, at each clutch actuator position or DCT application force where DISG and DCT torque was determined, the amount of torque transferred by the DCT is input to a DCT transfer function. In this way, a new adapted DCT clutch transfer function may be provided. Method 600 proceeds to 622 after the DCT clutch transfer function is updated.

At 622, method 600 applies the adapted DCT clutch transfer function during vehicle launching and shifting. For example, if the vehicle's engine was automatically stopped and then restarted in response to a driver releasing a brake pedal, the controller may request that a specific amount of torque be transferred from the engine to the vehicle wheels through the DCT clutch during a vehicle launch. The DCT transfer function is indexed by the desired amount of torque to be transferred, and the DCT transfer function outputs a DCT actuator demand or position command. Alternatively, the DCT transfer function may output a DCT clutch application force and then the DCT clutch application force is converted into a DCT clutch actuator demand or position. Method 600 proceeds to exit after the DCT actuator is adjusted.

Thus, the method of FIG. 6 provides for a method for controlling a transmission launch clutch, comprising: adjusting a dual layshaft transmission clutch position during a vehicle stop and while vehicle brakes are applied; and adjusting a clutch actuator position during a vehicle launch responsive to an amount of torque transferred through the dual layshaft transmission clutch during adjusting the dual layshaft transmission clutch position during the vehicle stop. The method includes where the amount of torque transferred through the dual layshaft transmission is supplied via a DISG.

In another example, the method further comprises opening a disconnect clutch in response to the vehicle stop. The method further comprises adjusting the dual layshaft transmission clutch in response to a transmission temperature. The method includes where adjusting the clutch actuator position includes increasing a clutch application force. The method includes where the clutch application force is increased electromechanically. The method includes where the clutch application force is increased to a threshold clutch application force.

In another example, the method provides for controlling a transmission clutch, comprising: operating a DISG in a speed control mode; adjusting a dual layshaft transmission clutch position during a vehicle stop, while vehicle brakes are applied, and while the DISG is in speed control mode; and adjusting a clutch actuator position during a vehicle launch responsive to an amount of torque transferred through the dual layshaft transmission clutch during adjusting the dual layshaft transmission clutch position during the vehicle stop. The method further comprises monitoring a DISG current during the speed control mode.

In another example, the method further comprises estimating the amount of torque transferred through the dual layshaft clutch based on DISG current. The method further comprises storing the amount of torque transferred through the dual layshaft clutch in memory. The method further comprises opening a disconnect clutch before operating the DISG in the speed control mode. The method includes where adjusting the dual layshaft transmission clutch position includes ramping a clutch application force. The method includes where the clutch application force is ramped to a threshold clutch application force.

As will be appreciated by one of ordinary skill in the art, methods described in FIG. 6 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A system for controlling a transmission, comprising:
   a vehicle including brakes;
   an engine coupled to the vehicle;
   a driveline integrated starter/generator (DISG);
   a disconnect clutch positioned in a driveline between the engine and upstream of the DISG;
   a dual mass flywheel positioned in the driveline between the engine and the disconnect clutch;
   a transmission positioned in the driveline downstream of the DISG, the transmission including a transmission clutch; and
   a controller, the controller including non-transitory executable instructions to open the driveline disconnect clutch and adjust an application force of the transmission clutch while the brakes are being applied and the vehicle is stopped in response to conditions being present for adjusting a transfer function of the transmission clutch;
   the controller further comprising additional non-transitory executable instructions to operate the DISG at a constant speed while the application force of the transmission clutch is adjusted in response to conditions being present for adjusting the transfer function of the transmission clutch; and
   the controller further comprising additional non-transitory executable instructions for determining an amount of torque transferred across the transmission clutch via DISG current when the application force of the transmission clutch is adjusted.

2. The system of claim 1, further comprising additional non-transitory executable instructions for adjusting the transmission clutch during a vehicle launch responsive to the amount of torque transferred across the transmission clutch when the application force of the transmission clutch is adjusted.

3. The system of claim 2, further comprising additional non-transitory executable instructions for determining the amount of torque transferred across the transmission clutch based on the DISG current.

4. The system of claim 3, further comprising additional non-transitory executable instructions for adjusting the transfer function of the transmission clutch in response to the amount of torque transferred across the transmission clutch.

* * * * *